US012506269B2

(12) United States Patent
Zhou et al.

(10) Patent No.: US 12,506,269 B2
(45) Date of Patent: Dec. 23, 2025

(54) ANTENNA ASSEMBLY FOR INTEGRATED CIRCUIT PACKAGE

(71) Applicant: Intel Corporation, Santa Clara, CA (US)

(72) Inventors: Zhen Zhou, Chandler, AZ (US); Tae Young Yang, Portland, OR (US); Shuhei Yamada, Hillsboro, OR (US); Tolga Acikalin, San Jose, CA (US); Johanny Escobar Pelaez, Jalisco (MX); Kenneth Foust, Beaverton, OR (US); Jason Mix, Portland, OR (US); Renzhi Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 992 days.

(21) Appl. No.: 17/357,658

(22) Filed: Jun. 24, 2021

(65) Prior Publication Data

US 2022/0416428 A1 Dec. 29, 2022

(51) Int. Cl.
*H01Q 1/22* (2006.01)
*H01Q 9/04* (2006.01)
(Continued)

(52) U.S. Cl.
CPC ......... *H01Q 9/0457* (2013.01); *H01Q 1/2283* (2013.01); *H01Q 1/243* (2013.01); *H01Q 1/38* (2013.01)

(58) Field of Classification Search
CPC .... H01Q 9/0457; H01Q 1/2283; H01Q 1/243; H01Q 1/38; H01Q 9/42; H01Q 13/10; H01Q 21/24
See application file for complete search history.

(56) References Cited

U.S. PATENT DOCUMENTS 10,651,559 B2 * 5/2020 Sovero ..................... H01Q 1/24
2006/0139211 A1 * 6/2006 Vance .................... H01Q 5/328
343/700 MS (Continued)

OTHER PUBLICATIONS

"BLE Antenna Design Guide," Rev 2.0—May 2018; Application note; Micro-Strip Antenna, Metal plate antenna, Chip antenna, test procedure; NXP Semiconductorsv; 43 pages.

(Continued)

*Primary Examiner* — Dameon E Levi
*Assistant Examiner* — Michael M Bouizza
(74) *Attorney, Agent, or Firm* — Schwabe, Williamson & Wyatt, P.C.

(57) ABSTRACT

Various embodiments provide systems, devices, and methods for an antenna assembly included in an integrated circuit (IC) package. The antenna assembly may be used for near field wireless communication such as package-to-package and/or chip-to-chip communication. The antenna assembly may include a feed plate (e.g., a top feed) that is capacitively coupled to a first via and a second via. The feed plate may further be capacitively coupled to a loading structure. The first via may be conductively coupled to a ground potential. In some embodiments, the antenna assembly may further include a stub structure (e.g., an open stub or a short stub) that is conductively coupled to the second via. An impedance matching network may be coupled between the feed plate and an IC die that communicates using the antenna assembly. Other embodiments may be described and claimed.

25 Claims, 12 Drawing Sheets

(51) Int. Cl.

*H01Q 1/24* (2006.01)
*H01Q 1/38* (2006.01)

(56) References Cited

U.S. PATENT DOCUMENTS

| | | | | |
|---|---|---|---|---|
| 2007/0229372 | A1* | 10/2007 | Desclos | H01Q 1/273<br>343/702 |
| 2010/0219513 | A1* | 9/2010 | Zhang | H01Q 13/08<br>257/659 |
| 2016/0056544 | A1* | 2/2016 | Garcia | H01Q 9/0407<br>343/725 |
| 2018/0212306 | A1* | 7/2018 | Elsherbini | H01Q 1/2283 |
| 2019/0214721 | A1* | 7/2019 | Hu | H01Q 5/385 |
| 2019/0305430 | A1* | 10/2019 | Thai | H01Q 1/2283 |
| 2019/0348749 | A1* | 11/2019 | Thai | H01Q 1/243 |

OTHER PUBLICATIONS

"PIFA—Planar Inverted F Antenna," lulian Rosu, YO3DAC / VA3IUL—http://www.qsl.net/va3iul; 4 pages.

* cited by examiner

ANTENNA ASSEMBLY FOR INTEGRATED CIRCUIT PACKAGE

FIELD

Embodiments of the present invention relate generally to the technical field of electronic circuits, and more particularly to antenna assemblies for integrated circuit packages and associated devices, systems, and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Wireless interconnections among integrated circuit (IC) packages offer flexibility such as multi-drop and broadcast communication, where one host device sends signals to multiple devices through wireless connections. The wireless connections may drastically reduce the physical interconnections between the integrated circuit packages and/or provide higher data rates for control, manageability, test, and debug functions, general data transfer, and/or other communication within compute systems. Accordingly, the wireless connections may overcome the challenges of wired connections, such as number of pins, tangled wires, number of board layers, latency, and/or cost, among others, which essentially limits the scalability of the host device's connection with other devices.

However, the present options for an antenna topology as a package integrated antenna are extremely limited because the antenna must operate in an environment that is full of impairments, such as the source current cancellation imposed by the presence of various defected ground planes and vertical vias in addition to a restrictive metal fill requirement. Moreover, the package naturally imposes a size constraint on the antenna which makes a full-size antenna practically nonviable, particularly when the antenna must operate in a sub-10 GHz frequency band and have a wide bandwidth.

For example, conventional antennas include a planar inverted-F antenna (PIFA) with ground plane cutouts on both the package substrate and the mother board printed circuit board (PCB). However, the PIFA has a large footprint on the package, a narrow band, low radiation efficiency, and limited communication distance due to image current cancellation caused by the ground plane of the mother board. Additionally, the feed in a PIFA is typically connected from the bottom ground of the antenna. For a transceiver in an integrated circuit die located at the top of the package, the routing to the antenna feed is complex. Some devices include lumped elements embedded in the package substrate on the package surface, causing the routing to zig-zag through package layers and thereby increasing routing loss and complexity.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1A:
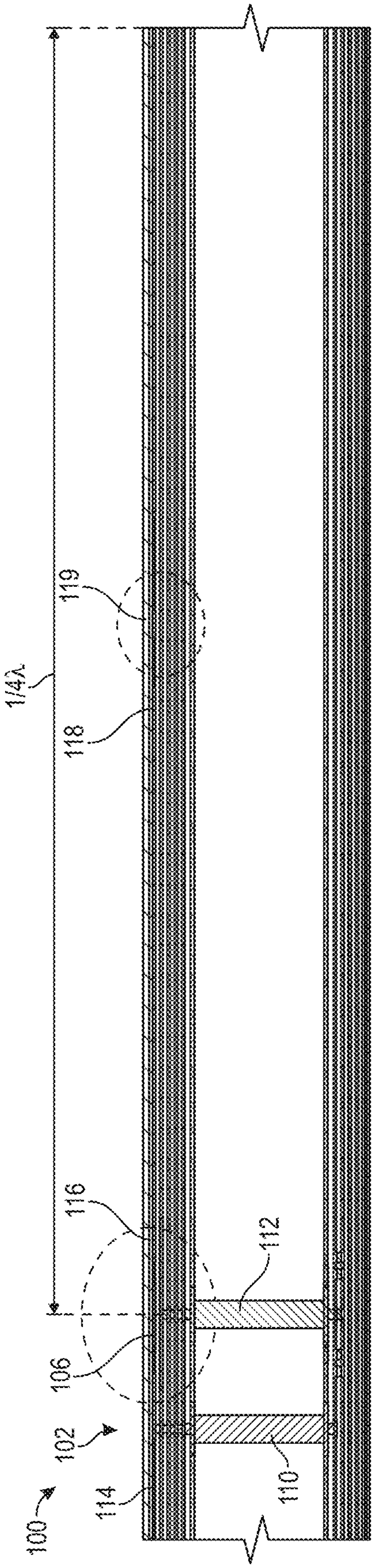
FIG. 1A illustrates a side view of an integrated circuit (IC) package that includes an antenna assembly, in accordance with various embodiments.
Figure 1B:
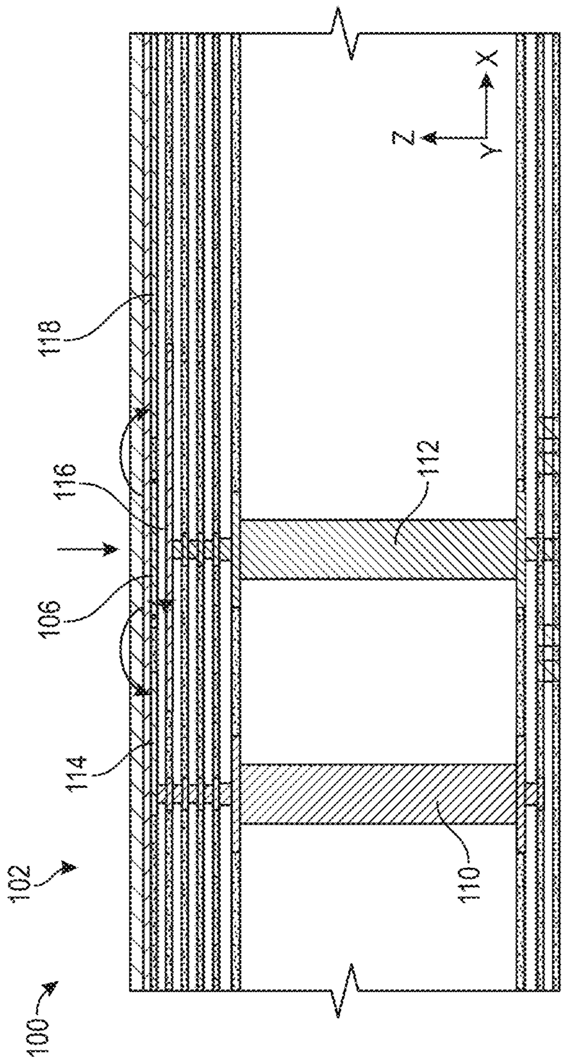
FIG. 1B illustrates a zoomed in view of a portion of FIG. 1A.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Various embodiments herein provide an antenna assembly for an integrated circuit (IC) package. The antenna assembly may be used by an IC die for wireless communication, for example near field wireless communication such as package-to-package and/or chip-to-chip communication. The IC die may be included in the same IC package or in another IC package that is coupled to the IC package that includes the antenna assembly (e.g., in a package-on-package configuration).

The antenna assembly may include a feed plate that is capacitively coupled to a first via and a second via. The feed plate may further be capacitively coupled to a loading structure that includes one or more loading elements. The one or more loading elements may include for example, one or more resistive loading elements, capacitive loading elements, and/or inductive loading elements. For example, in some embodiments, the loading element may include a conductive strip with one or more gaps. The loading structure may reduce the overall size of the antenna while maintaining the operational bandwidth.

In various embodiments, the first via may be conductively coupled to a ground potential (e.g., a bottom ground plane of the IC package). In some embodiments, the antenna assembly may further include a stub structure that is conductively coupled to the second via. The length of the stub structure may provide tuning of the resonant frequency of the antenna. In some embodiments, the stub structure may be an open stub (not conductively coupled to ground) or a short stub (conductively coupled to ground). The stub structure may have any suitable shape, such as a straight line, a meandering line, or another suitable shape. In other embodiments, the second via may be directly coupled to ground (e.g., without a stub structure).

In some embodiments, the feed plate may be a top feed, e.g., located in one or more top layers of the IC package, such as in one or more of the top two layers. The antenna assembly may further include an impedance matching network (e.g., a $\pi$ network) coupled between the feed plate and the IC die. In some applications, the IC die may have a balanced output/input (differential output/input) while the antenna has an unbalanced feed. Accordingly, a balanced-to-unbalanced impedance transformer (balun) may be included. In some embodiments, the balun may be implemented on the IC die. In other embodiments, the balun may be implemented in the IC package and combined with the impedance matching network, thereby saving area on the IC die.

FIG. 1A-1E illustrate various views of an IC package 100 that includes an antenna assembly 102 in accordance with various embodiments. The antenna assembly 102 may be coupled to an IC die 104 to enable wireless communication via radio frequency (RF) signals. For example, the antenna assembly 102 may be used by the IC die 104 for package-to-package and/or chip-to-chip communication (e.g., short-range communication, such as 25 or 50 centimeters or less). The wireless communication may use any suitable communication protocol or frequency band. For example, some embodiments may use a sub-10 GHz band, such as ultra-wide band (3.1-10.6 GHz). In other embodiments, a higher or lower frequency band may be used.

In various embodiments, the antenna assembly 102 may include a feed plate 106. The feed plate 106 may provide a top feed for the IC die 104. For example, the feed plate 106 may be included in one or more of the top layers of the IC package 100, such as the top layer and/or the second highest layer. In embodiments, the antenna assembly 102 may further include an impedance matching network 108 (e.g., a $\pi$ network) coupled between the feed plate 106 and the IC die 104 to provide impedance matching. In some embodiments, the impedance matching network 108 may include a balun to couple the single-ended antenna with a differential output of the IC die 104.

In various embodiments, the antenna assembly 102 may further include a first via 110 and a second via 112 that are capacitively coupled to the feed plate 106. In embodiments, the first via 110 and second via 112 may include respective plates 114 and 116 at a top end of the via to provide the capacitive coupling. The feed plate 106, first via 110, and/or second via 112 may be located at an edge of the IC package 100 (e.g., to promote radiation of the RF signal).

The antenna assembly may further include a loading structure 118 that is capacitively coupled to the feed plate 106 to provide loading and/or reconfigurability of the communication band. The loading structure 118 may include one or more loading elements (e.g., resistive loading elements, capacitive loading elements, and/or inductive loading elements). The loading elements may be lumped passive elements in some embodiments. In some embodiments, at least one of the loading elements may extend in a first horizontal direction that is perpendicular to the vertical axis of the first and second vias 110 and 112. Additionally, or alternatively, at least one of the loading elements or a combination of loading elements may have a length of about ¼ $\lambda$ (the wavelength of the tuning frequency of the antenna assembly 102). As shown in FIGS. 1A-1E, the loading structure 118 may include a conductive strip with one or more breaks 119 in it (e.g., a break in the middle as shown) that forms a resistive loading element. Other shapes or configurations of the loading structure 118 may be used in other embodiments.

In some embodiments, the loading structure 118 may further include one or more active devices to provide reconfigurability of the communication band (e.g., single or multi-band reconfigurability). For example, the loading structure 118 may include a diode with a lumped element network.

Accordingly, the source signal from the IC die 104 is capacitively coupled to two vertical vias 110 and 112 through a top feeding tap provided by feed plate 106 and impedance matching network 108. The loading structure 118 may work in conjunction with the vias 110 and 112 and the ground plane on the bottom of the core layer of the package 100 to form a vertically polarized slot antenna.

Additionally, the loading structure 118 may form a monopole antenna with the second via 112 as well as the ground plane below the core. The horizontal current flowing on the loading structure 118 induces the return currents on both the bottom ground (the bottom layer of the core) and the top side ground plane, the return currents cannot completely offset the driving current on the strip. The net horizontal current on the loading structure 118 leads to a horizontally polarized radiation.

Among other benefits, the top feeding of the antenna assembly 102 facilitates the design and implementation of the impedance matching network 108, as well as the signal routing from and/or to the IC die 104. Additionally, the top feeding may reduce and/or eliminate any vertical current which is out of phase with the radiation current induced on the second via 112.

Figure 1C:
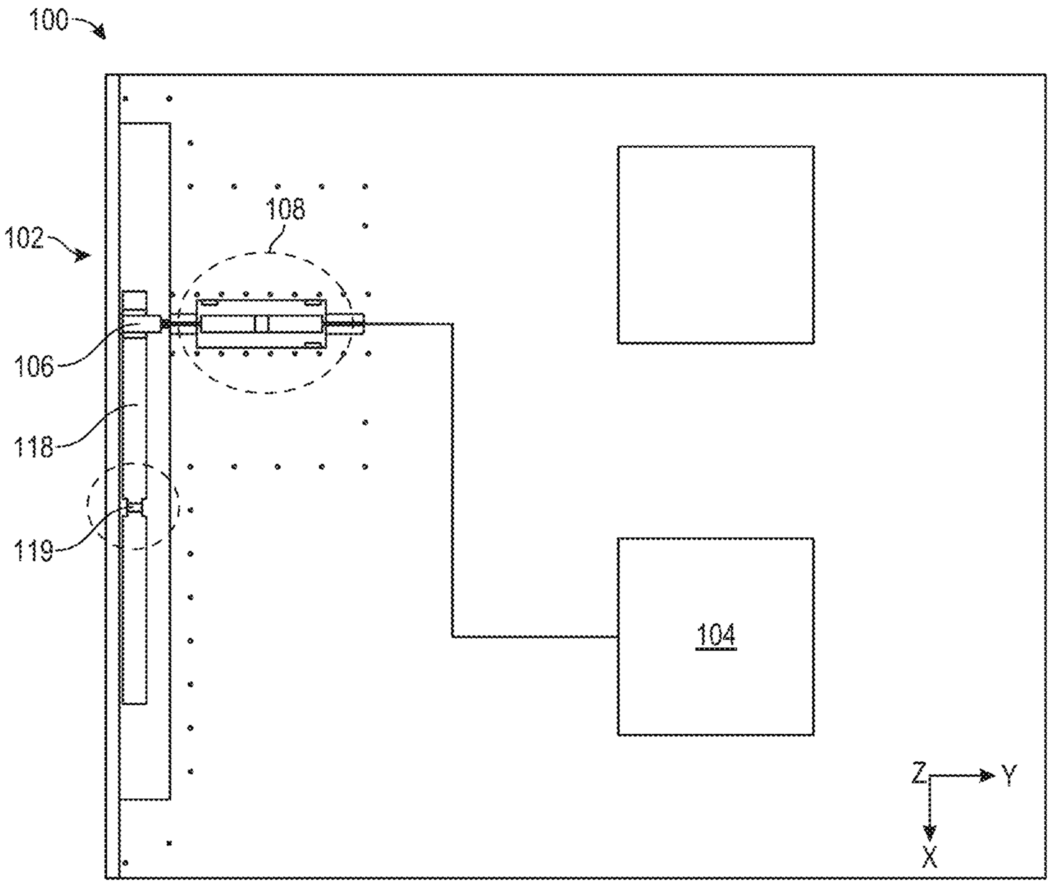
FIG. 1C illustrates a top view of the IC package of FIG. 1A.
Figure 1D:
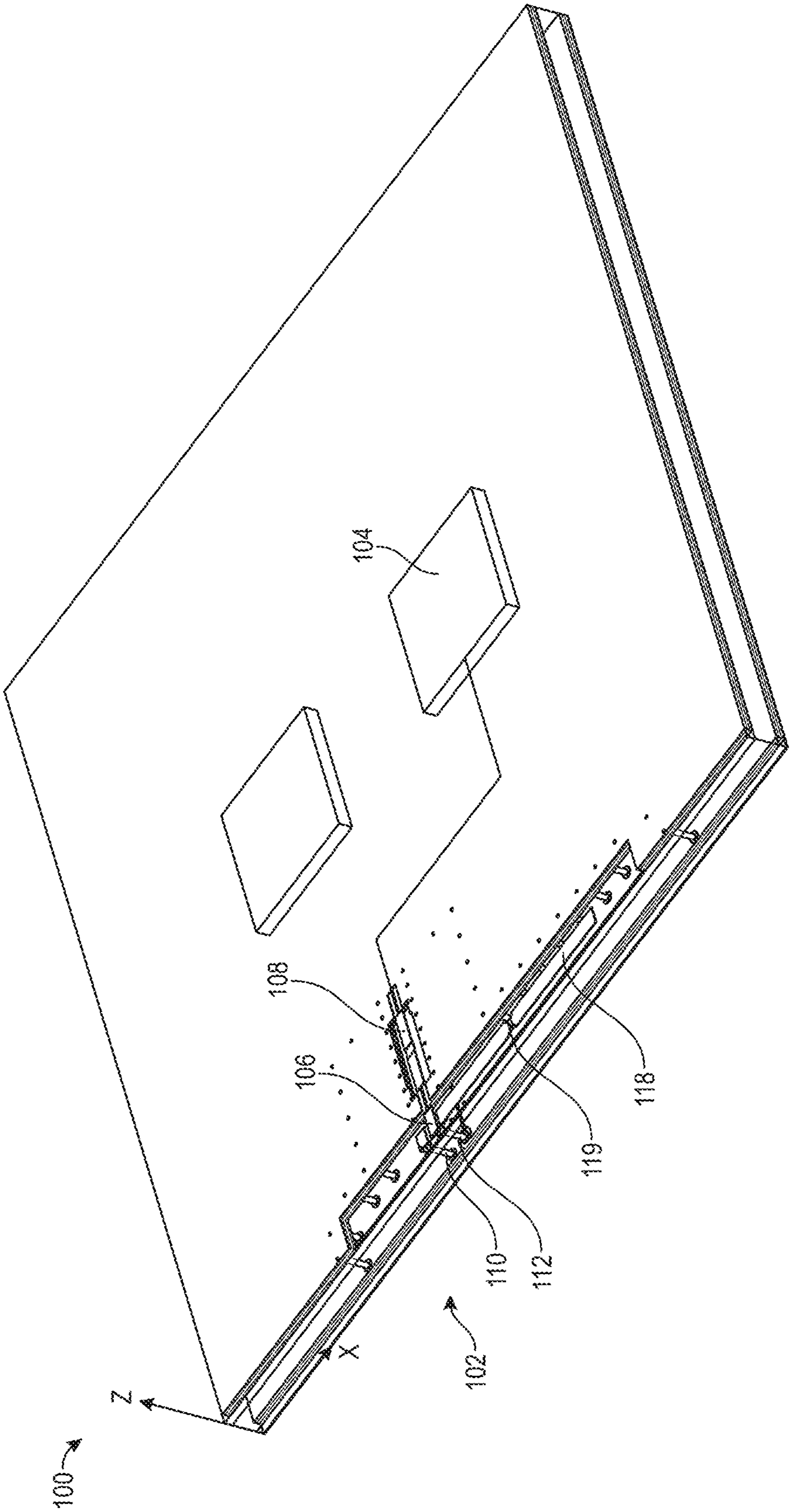
FIG. 1D illustrates a top perspective view of the IC package of FIG. 1A.
Figure 1E:
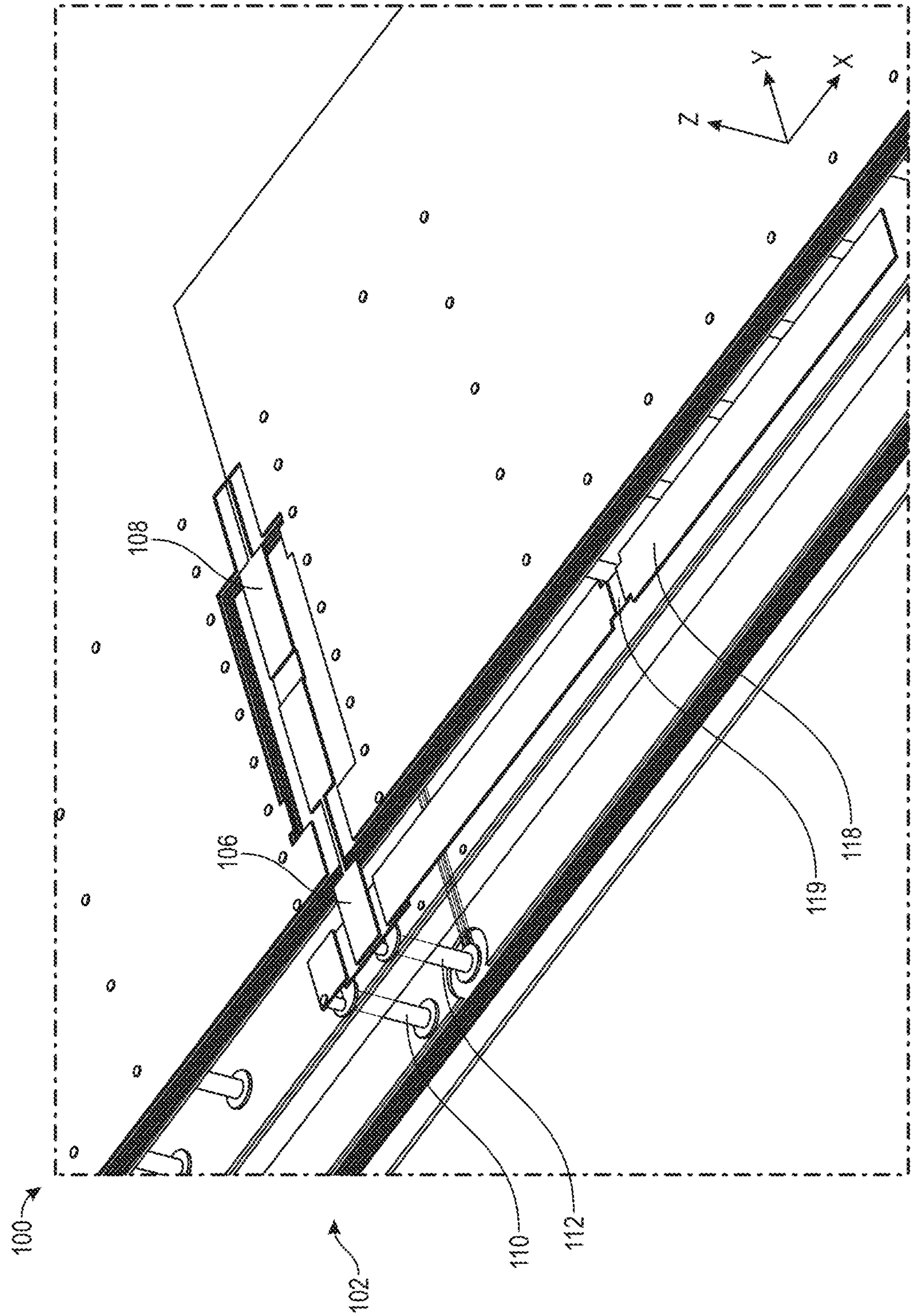
FIG. 1E illustrates a zoomed in view of a portion of FIG. 1D.

Since the impedance of the transceiver (e.g., of the IC die 104) might not be always set to be the nominal impedance (e.g., 50Ω) to achieve its optimal performance, the impedance mismatch is unavoidable. The impedance matching network 108 may provide impedance tuning between the antenna and the transceiver. To facilitate the lumped element assembly of the impedance matching network 108, the shunt elements may be coupled to two different side ground planes around the series component (e.g., as shown in FIG. 1C).

Both the vertically polarized and horizontally polarized radiations contribute to the near field radiation. In one example simulation performed by the inventors, the antenna exhibited a peak gain of −6.9 dB for vertical polarization and −7.7 dB for horizontal polarization. Accordingly, the polarization pattern may reasonably cover a hemispherical volume over a mother board.

Figure 2:
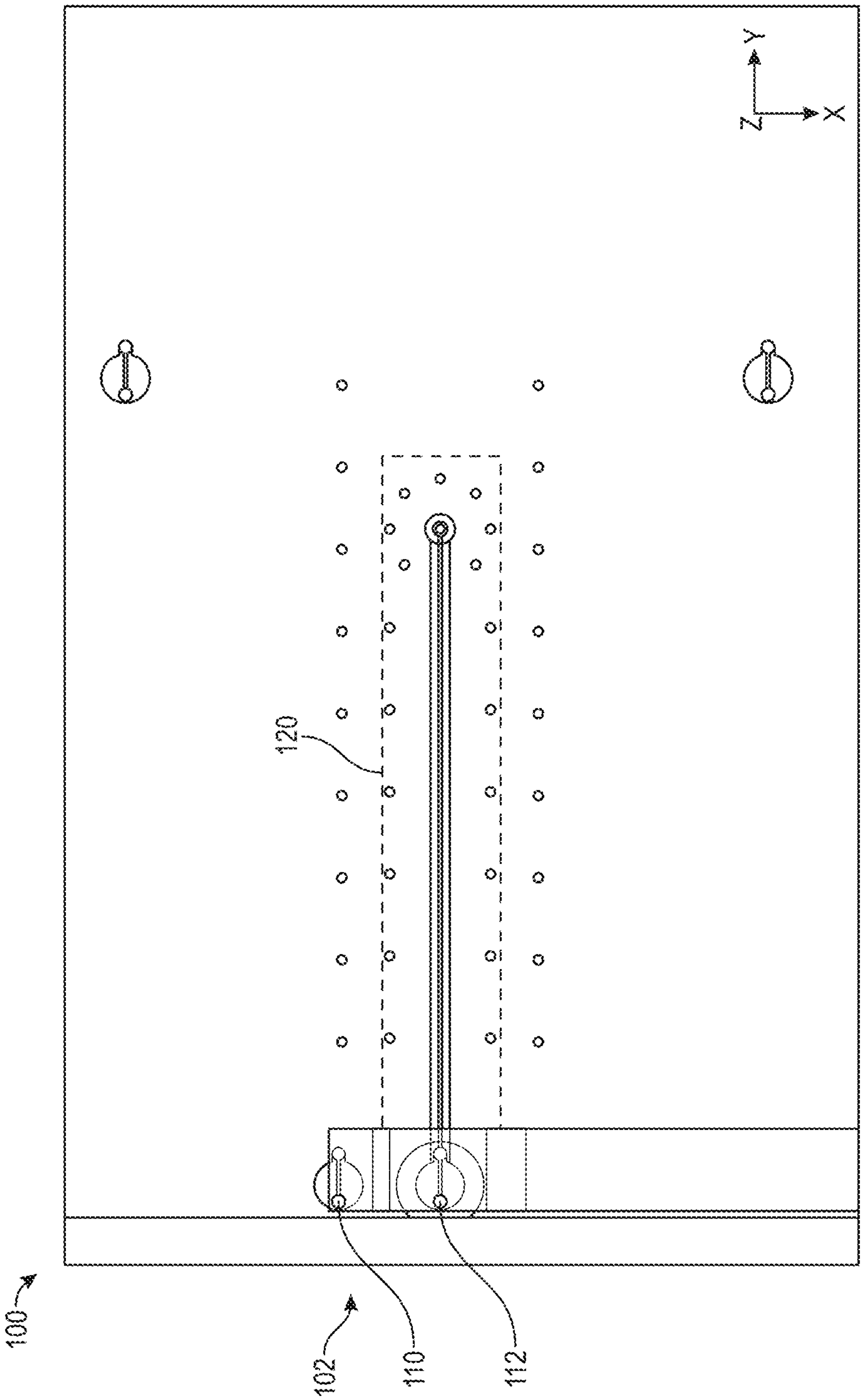
FIG. 2 illustrates a top cross-sectional view of an open stub that may be included in the antenna assembly of the IC package in FIGS. 1A-1D, in accordance with various embodiments.

In various embodiments, the bottom end of the first via 110 may be coupled to ground. In some embodiments, the bottom end of the second via 112 may be coupled to an open stub. For example, FIG. 2 illustrates a cross-sectional view of the package 100 to illustrate an open stub 118 that is coupled to the bottom end of the second via 112.

The open stub 120 may include a conductive strip that extends from the second via 112. The open stub may be a straight line or may have a different shape. Additionally, or alternatively, the open stub 120 may have a uniform or non-uniform width. In some embodiments, the open stub 120 may extend perpendicularly to the second via 112, such as in a second horizontal direction that is orthogonal to both the second via 112 and the first horizontal direction of the loading structure 118 (e.g., perpendicular to the side of the package 100). The distal end of the open stub 120 may be floating (e.g., not conductively coupled to ground). In some embodiments, the open stub 120 may be formed in a package layer that is one layer above the bottom of the core (e.g., ground plane). In other embodiments, the open stub 120 may be formed in a different layer of the IC package 100.

In embodiments, the open stub 120 changes the electrical length of the signal path going from the feed plate 106 to the second via 112 and to ground. Accordingly, altering the length of the open stub 120 may change the resonant frequency of the antenna (e.g., without changing the length of the loading structure 118). In embodiments, the open stub 120 may have an impedance equal to the nominal impedance of the antenna (e.g., 50Ω). The first and/or second vias 110 and 112 may additionally or alternatively have an impedance equal to the nominal impedance (e.g., 50Ω). Through the capacitive coupling and inductive coupling, the open stub 120 may effectively act as a RF short to the ground plane.

In other embodiments, a short stub may be conductively coupled to the bottom end of the second via 112. The short stub may be similar to open stub 120, except that it is conductively coupled to ground (e.g., the bottom ground plane) at one or more locations.

Accordingly, the techniques described herein may utilize a package edge, a conductive strip, and vias to form an antenna that supports both horizontal and vertical polarization to provide for strong near field communication. The antenna may be fed through a capacitive coupling section to facilitate the design of the impedance matching network (e.g., a π matching network). In addition, a serial resistive loading may be used to extend the bandwidth of the antenna, to further reduce the overall electrical size of the antenna, and/or to broaden the impedance bandwidth. Moreover, the antenna may use an open-stub connected to one of the vertical radiation elements (vias) to control the antenna resonant frequency. Furthermore, the antenna may be fed from the top side of the antenna geometry, which significantly reduces routing loss and complexity.

The antenna uses a relatively small space on the package, and may be stacked on the package in some embodiments. The antenna may reduce package pincount or pin re-allocation. Additionally, the antenna may provide a relatively wide band, high data rate, and/or long communication distance compared to other designs. Accordingly, the antenna may be used in a variety of system types, such as client devices and/or server units. In some embodiments, the antenna may be used for point-to-multipoint broadcast messaging, thereby enabling efficient system communication.

Figure 3:
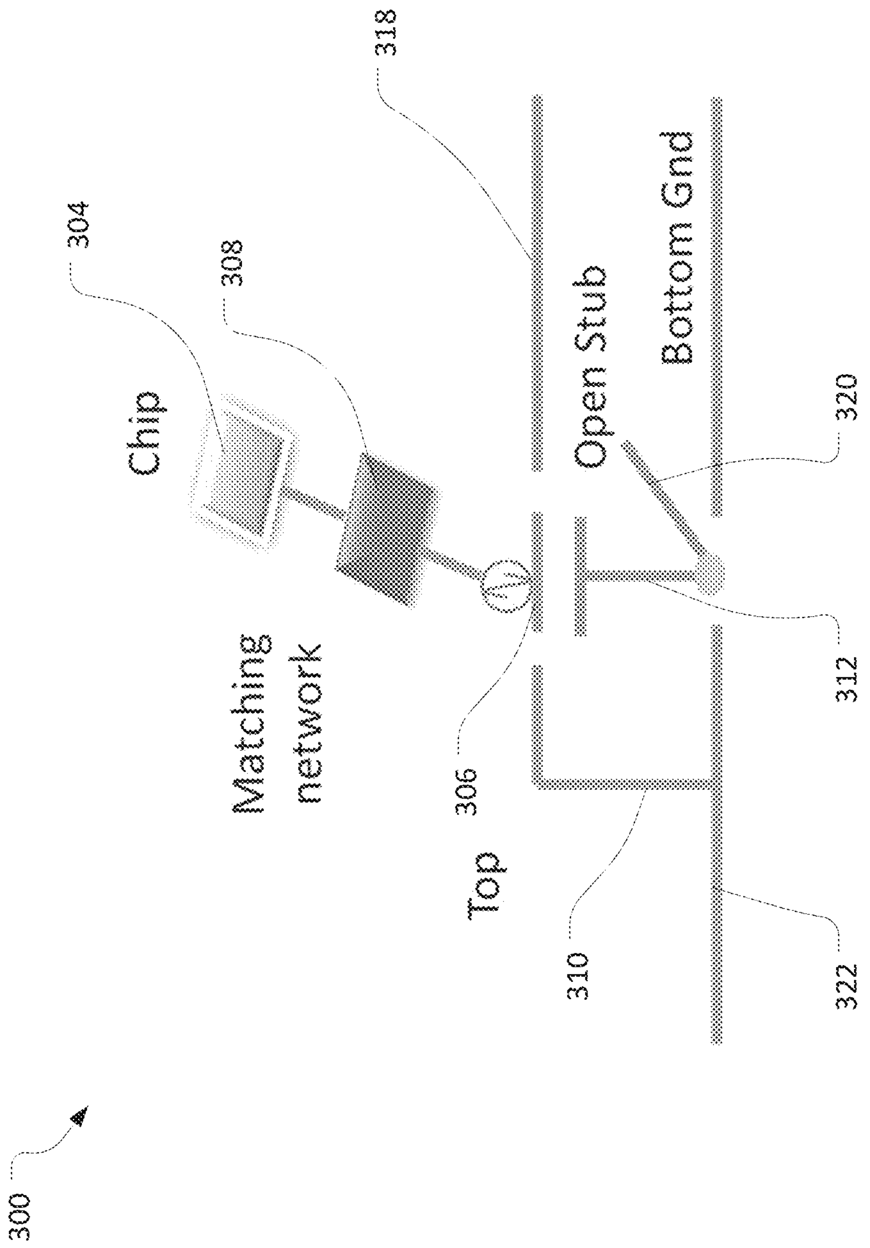
FIG. 3 schematically illustrates an antenna assembly, in accordance with various embodiments.

FIG. 3 illustrates a schematic view of an antenna assembly 300 in accordance with various embodiments. The antenna assembly 300 may generally correspond to the antenna assembly 100. For example, the antenna assembly 300 may include a feed pad 306 that is capacitively coupled to a first via 310, a second via 312, and a resistive loading strip 318. The first via 310 may be coupled to a ground plane 322, while the second via 312 may be coupled to an open stub 320.

Figure 4:
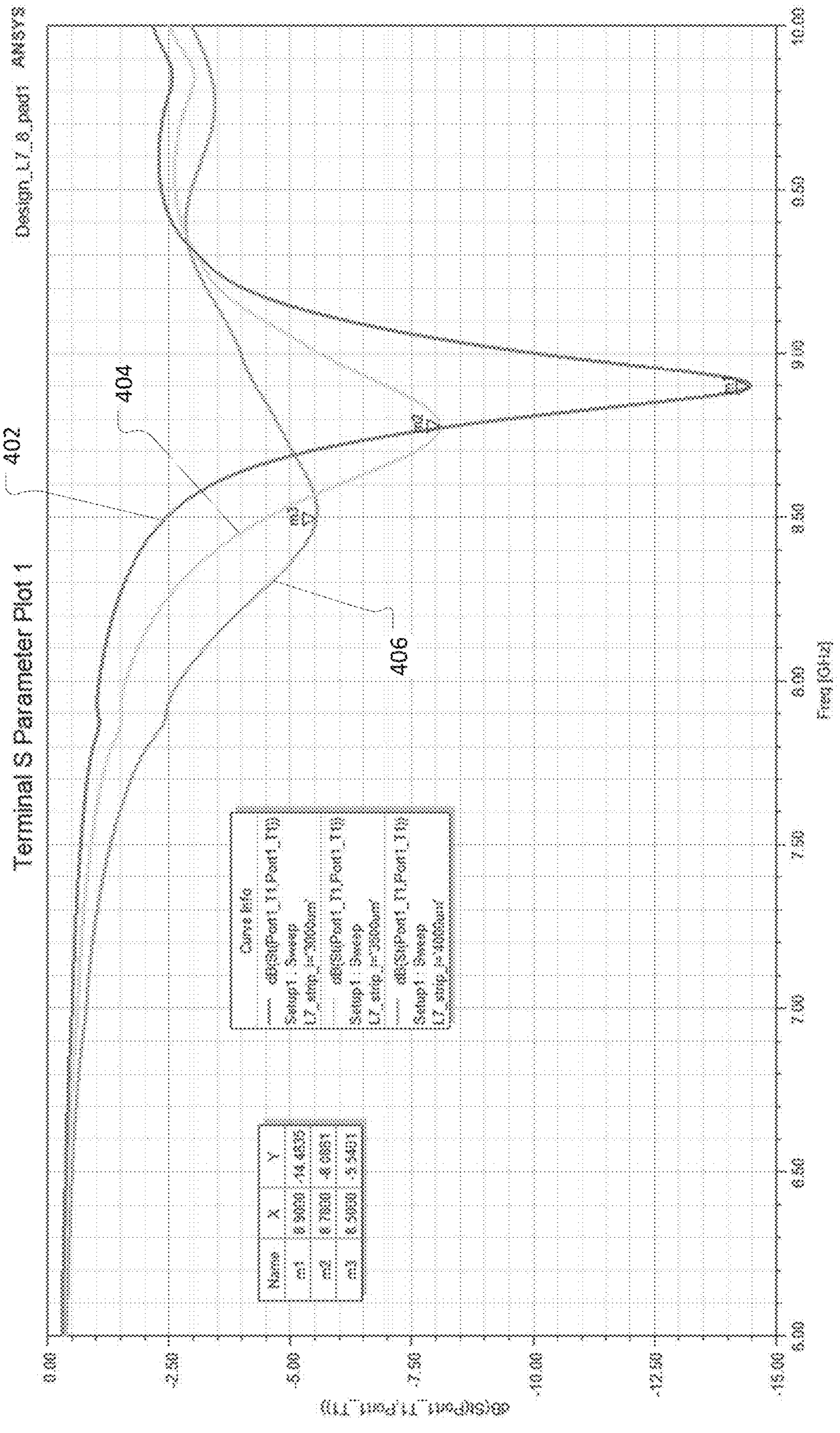
FIG. 4 illustrates plots of how the resonant frequency and magnitude of the reflection of an example antenna assembly varies with the length of the open stub, in accordance with various embodiments.

FIG. 4 illustrates plots of how the resonant frequency and magnitude of the reflection of the antenna described herein varies with the length of the open stub. The plots are based on an antenna model that corresponds to an example implementation of the antenna described herein that targets a resonant frequency at 9 GHz. Plots 402, 404, and 406 illustrate the magnitude of reflection versus frequency for an open stub length of 3,000 μm, 3,500 μm, and 4,000 μm, respectively.

Figure 5:
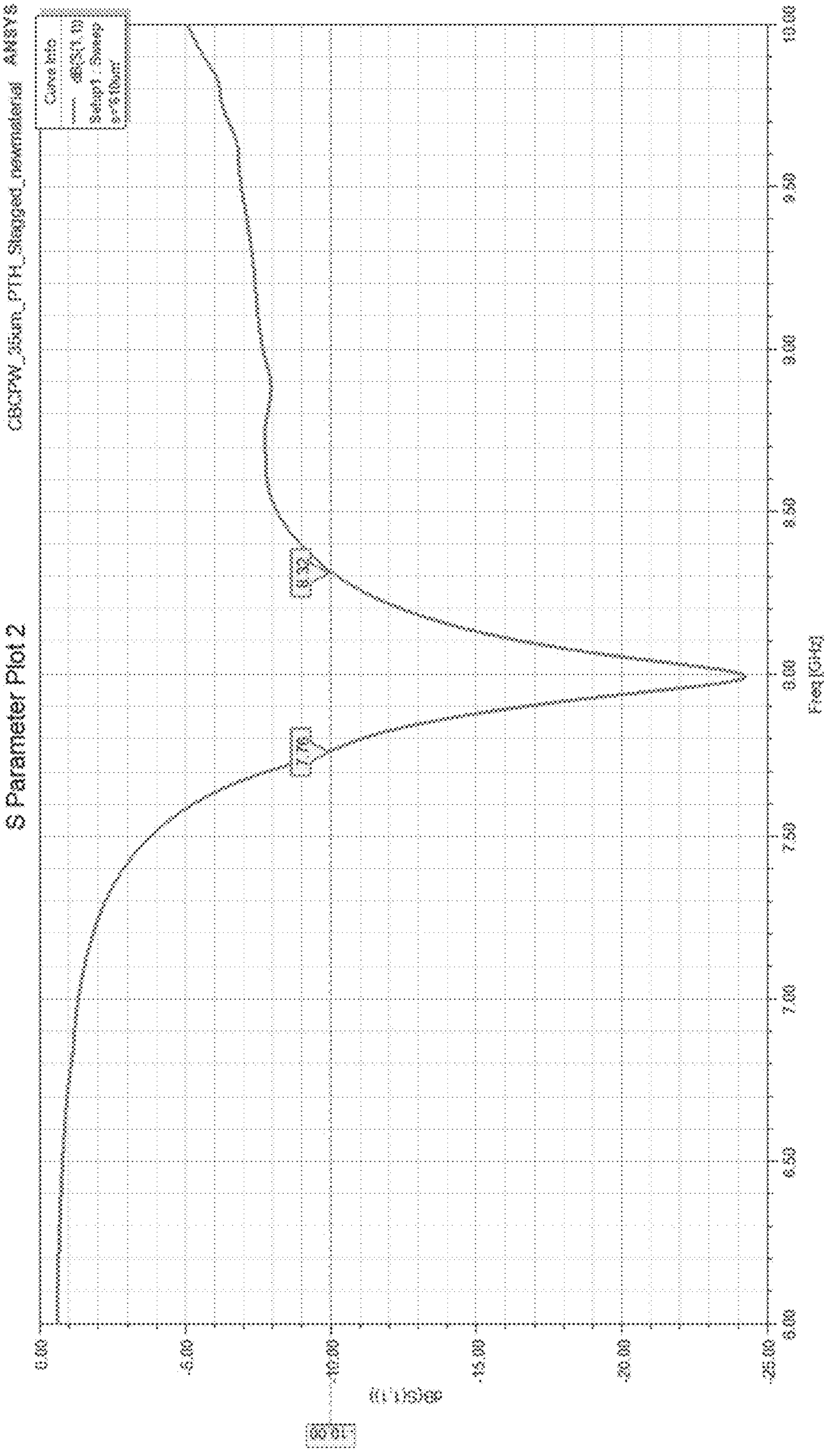
FIG. 5 illustrates another plot of magnitude of reflection of an antenna simulation with an example 8 GHz design and a resistive loading of 10Ω, in accordance with various embodiments.

FIG. 5 illustrates another plot of magnitude of reflection of an antenna simulation with an example 8 GHz design and a resistive loading of 10Ω. In the example, the antenna achieves an impedance bandwidth of 560 MHz with a return loss of greater than 10 dB.

Figure 6:
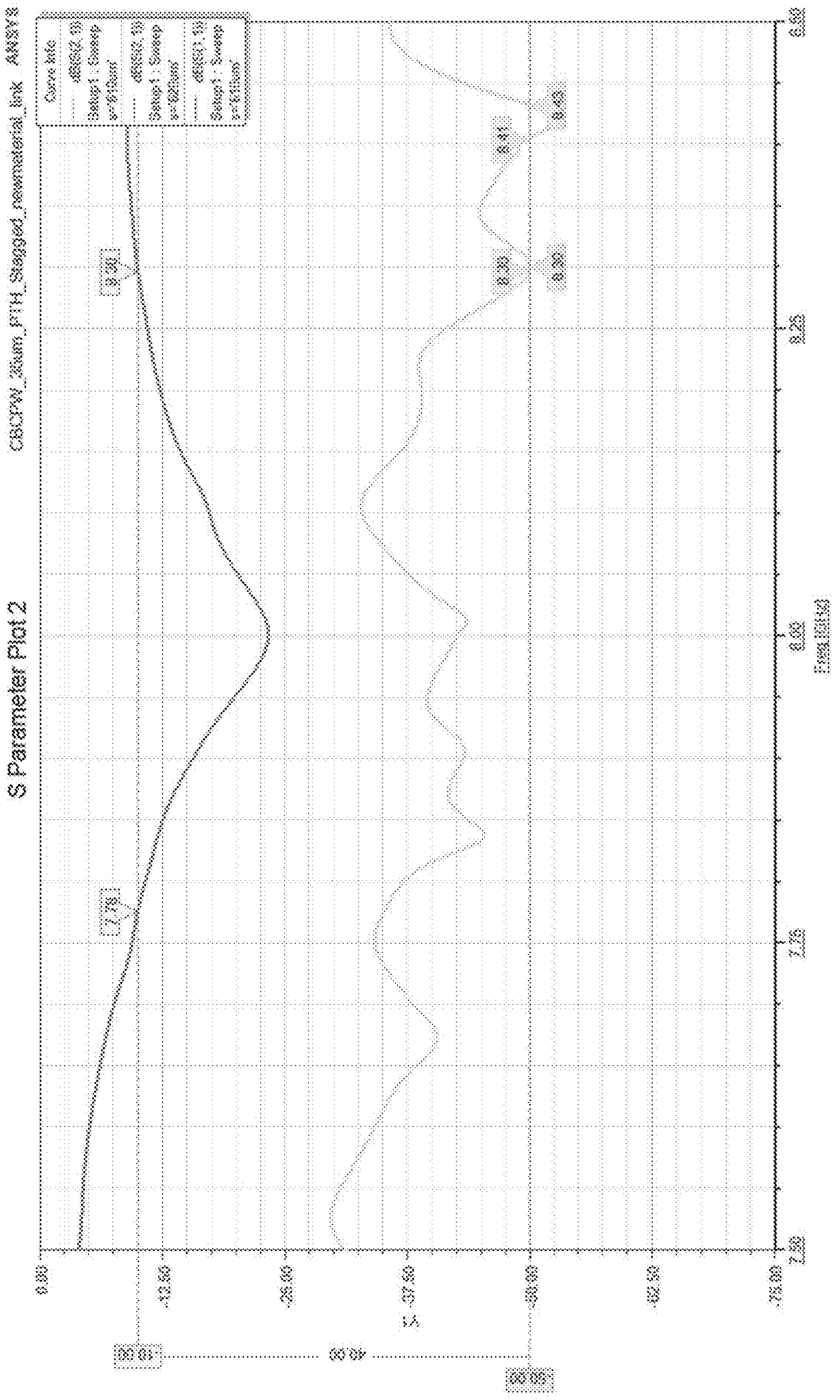
FIG. 6 illustrates an example of link performance for a simulation of an antenna assembly using a line-of-sight link of 17 cm with a metallic chassis 5 mm above the package, in accordance with various embodiments.

Additionally, a simulation was performed for the antenna assembly described herein using a line-of-sight link of 17 cm with a metallic chassis 5 mm above the package. The link performance is shown in FIG. 6. The antenna demonstrated 520 MHz-10 dB return loss bandwidth and more than 800 MHz-50 dB transmission bandwidth.

Figure 7:
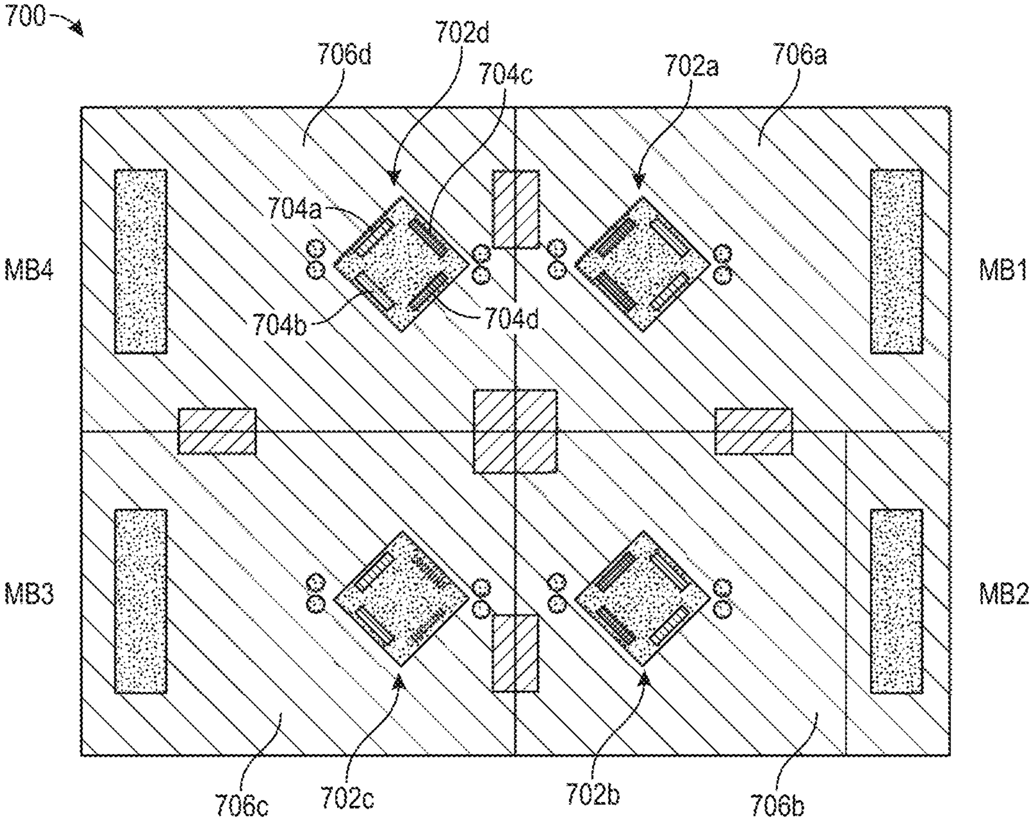
FIG. 7 illustrates an example system that includes a plurality of IC packages with integrated antenna assemblies, in accordance with various embodiments.

FIG. 7 illustrates an example system 700 that includes a plurality of IC packages 702*a-d*, in accordance with various embodiments. The IC packages 702*a-d* may each include one or more antennas 704*a-d*, which may correspond to the antenna assemblies described herein (e.g., antenna assembly 100 and/or 300). In some embodiments, the antennas 704*a-d* may be transmit antennas, receive antennas, and/or used for both transmission and reception. Additionally, or alternatively, the antennas 704*a-b* may be tuned for different frequency bands in some embodiments. In one example, antennas 704*a-b* may be tuned to a first frequency band (e.g., 8 GHz frequency band) and antennas 704*c-d* may be tuned to a second frequency band (e.g., 9 GHz frequency band).

In some embodiments, as shown in FIG. 7, the IC packages 702*a-d* may be mounted to different mother boards 706*a-d*. In other embodiments, two or more of the IC packages 702*a-d* may be mounted to the same motherboard.

In some embodiments, the techniques described herein may be used with a package-on-package (PoP) configuration. For example, a PoP assembly may include a first package and a second package. The first package may include an IC die and the second package may include an antenna assembly that is used by the IC die for wireless communication (e.g., near-field communication). In some embodiments, the second package may be an interposer.

Figure 8:
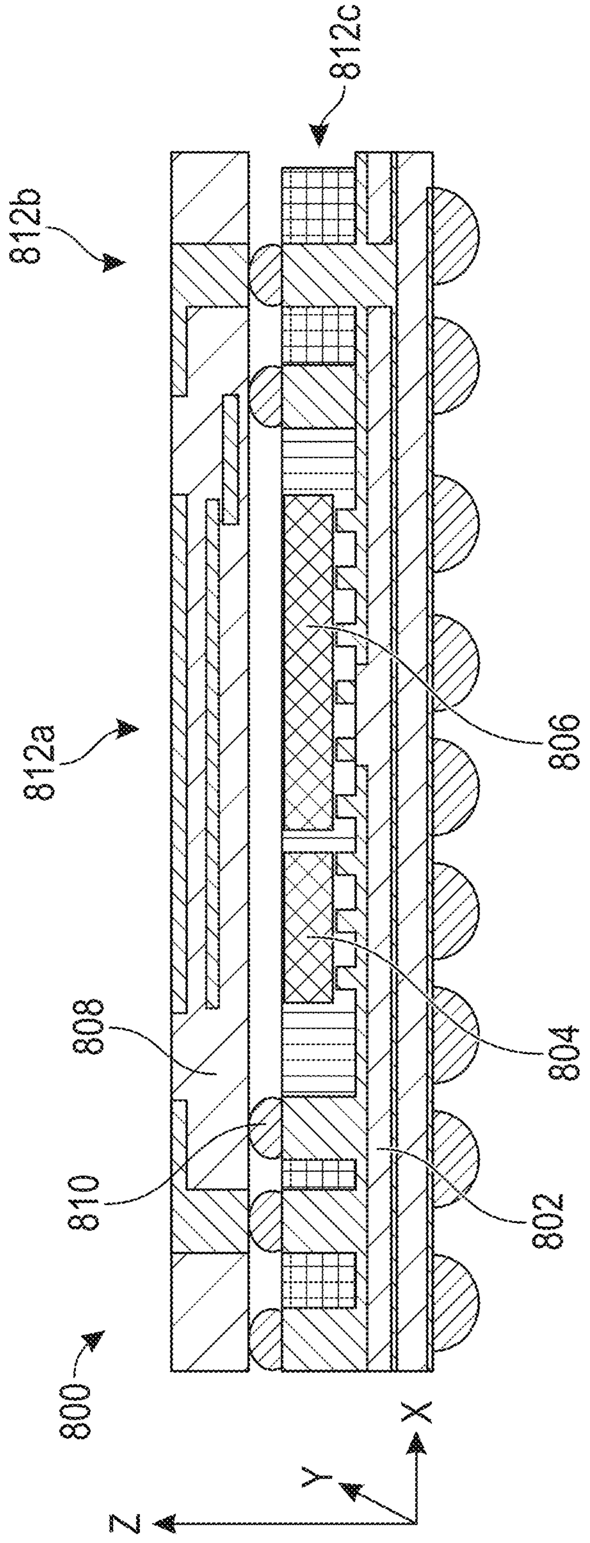
FIG. 8 illustrates a package-on-package assembly, in accordance with various embodiments.

As an example, FIG. 8 illustrates a PoP assembly 800 in accordance with various embodiments. The PoP assembly 800 includes a first IC package 802 that includes an IC die 804 and a RF IC 806. The PoP assembly 800 further includes a second IC package 808 that is coupled to the first IC package 802 via interconnects 810. In some embodiments, the second IC package 808 may be an interposer. The interconnects 810 may be, for example, copper pillars, solder balls, and/or another suitable metallic structure.

In some embodiments, one or more antenna assemblies as described herein may be included in the second IC package 808. The IC die 804 and/or RF IC 806 may send and/or receive RF communication signals via the one or more antenna assemblies. For example, FIG. 8 shows three example implementations for the antenna assembly, including a broadside antenna 812*a*, a diagonal directional antenna 812*b*, and an end fire antenna 812*c* (which may be included in the first IC package 802 and/or the second IC package 808).

Including the antenna assembly in the second IC package 808 may provide more flexibility in the configuration of the first IC package 802, such as enabling use of the antenna assembly with a first IC package 802 that may be too thin or not have a core to facilitate the antenna assembly. The PoP configuration may also provide improved antenna performance. In some embodiments, the second IC package 808 may be made using a lower density fabrication process than the first IC package 802 (e.g., at lower cost). Additionally, additional antenna structures may be enabled in the second IC package 808 to provide directionality to the antenna and/or create additional antenna elements (such as patch or coupler antennas). Furthermore, the impedance matching network may be implemented in the second IC package 808 as discrete passives and/or integrated structures, and/or the second IC package may provide additional antenna loading to tune the antenna performance.

Figure 9:
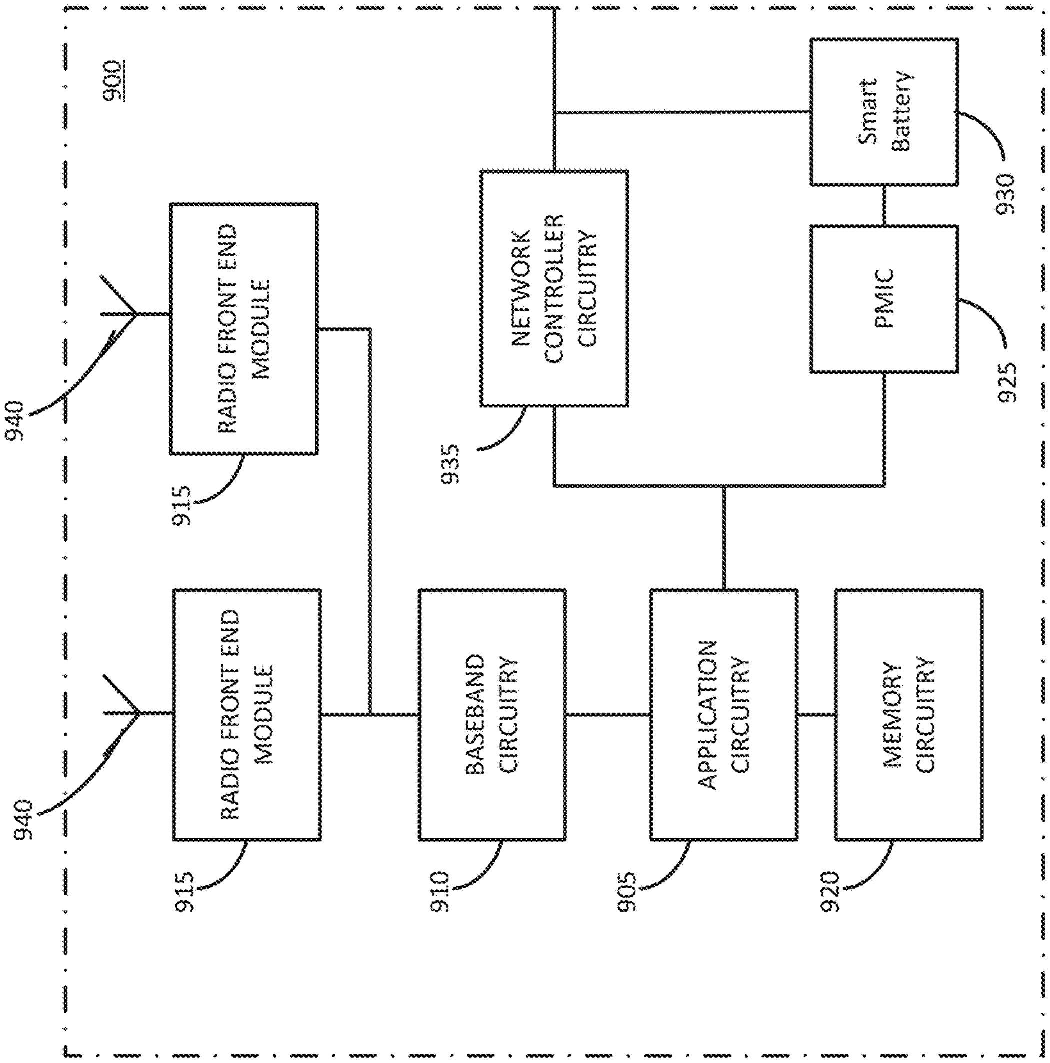
FIG. 9 illustrates an example of a computer platform in accordance with various embodiments.

FIG. 9 illustrates an example of a computing system 900 ("system 900") in accordance with various embodiments. The system 900 may include one or more of application circuitry 905, baseband circuitry 910, one or more radio front end modules 915, memory circuitry 920, power management integrated circuitry (PMIC) 925, and network controller circuitry 935. The system 900 may further include one or more antennas 940, at least one of which may correspond to the antenna described herein (e.g., antenna assembly 100 and/or 300). Additionally, in some embodiments, one or more components of the system 900 may correspond to one or more of the IC packages 702*a-d* of system 700 and/or to the PoP assembly 800.

The terms "application circuitry" and/or "baseband circuitry" may be considered synonymous to, and may be referred to as, "processor circuitry." As used herein, the term "processor circuitry" may refer to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 905 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or TO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 905 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the SYSTEM 900 may not utilize application circuitry 905, and instead may include a special-purpose processor/controller to process IP data received from an EPC or 7GC, for example.

Additionally or alternatively, application circuitry 905 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 905 may comprise logic blocks or logic fabric, and other interconnected resources that may be programmed to perform various functions, such as the procedures, methods, functions, etc. of the various embodiments discussed herein. In such embodiments, the circuitry of application circuitry 905 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 910 may be implemented, for example, as a solder-down substrate including one or more integrated circuits, a single packaged integrated circuit soldered to a main circuit board or a multi-chip module containing two or more integrated circuits. Although not shown, baseband circuitry 910 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915).

The radio front end modules (RFEM) 915 may include radio frequency integrated circuits (RFICs), amplifiers (for example, power amplifiers and low-noise amplifiers), and/or other components to effectuate over-the-air transmissions. The RFEM 915 may include beamforming circuitry to increase transmission/reception directivity. The RFEM 915 may send and/or receive signals via one or more antennas 940.

The memory circuitry 920 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 520 may be implemented as one or more of solder down packaged integrated circuits, socketed memory modules and plug-in memory cards.

The PMIC 925 may include voltage regulators, surge protectors, power alarm detection circuitry, and one or more backup power sources such as a battery or capacitor. The power alarm detection circuitry may detect one or more of brown out (under-voltage) and surge (over-voltage) conditions.

The network controller circuitry 935 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the system 900 using a physical connection, which may be electrical (commonly referred to as a "copper interconnect"), optical, or wireless. The network controller circuitry 935 may include one or more dedicated processors and/or FPGAs to communicate using one or more of the aforementioned protocols. In some implementations, the network controller circuitry 935 may include multiple controllers to provide connectivity to other networks using the same or different protocols.

The components shown by FIG. 9 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

In embodiments, the system 900 may perform near-field wireless communication with one or more other systems (e.g., unicast or broadcast communication) via one or more of the antennas 940 as described herein. Additionally, or alternatively, components of the system 900 may communicate with one another via a wireless interface using one or more of the antennas described herein.

EXAMPLES

Example 1 includes an integrated circuit package comprising: an integrated circuit; and an antenna coupled to the integrated circuit to enable a wireless communication links in a package-to-package or board-to-board environment. The antenna comprises: a feed pad; a first via capacitively coupled to the feed pad at a top end of the first via; and a second via capacitively coupled to the feed pad at a top end of the second via.

Example 2 includes the integrated circuit package of Example 1, wherein the feed pad is located in at least one of a top two layers of the integrated circuit package.

Example 3 includes the integrated circuit package of Example 1, wherein the antenna further includes a loading structure capacitively coupled to the feed pad to provide loading or reconfigurability.

Example 4 includes the integrated circuit package of Example 1, wherein the antenna further includes a stub structures conductively coupled to a bottom end of the second via.

Example 5 includes the integrated circuit package of Example 4, wherein the stub structure is an open stub.

Example 6 includes the integrated circuit package of Example 4, wherein a bottom end of the first via is conductively coupled to a ground potential.

Example 7 includes the integrated circuit package of Example 1, wherein the antenna further includes an impedance matching network coupled between the feed pad and the integrated circuit.

Example 8 includes the integrated circuit package of Example 7, wherein the impedance matching network includes a balanced-to-unbalanced impedance transformer.

Example 9 includes the integrated circuit package of Example 1, wherein the feed pad and the first and second vias are located at an edge of the integrated circuit package.

Example 10 includes an antenna assembly comprising: a feed pad; a first via capacitively coupled to the feed pad and conductively coupled to a ground potential; and a second via capacitively coupled to the feed pad and conductively coupled to a stub structure.

Example 11 includes the antenna assembly of Example 10, wherein the stub structure extends in a direction that is orthogonal to an axis of the second via.

Example 12 includes the antenna assembly of Example 11, further comprising a loading structure capacitively coupled to the feed pad to provide at least one of resistive loading, capacitive loading, inductive loading, or reconfigurability of an operating frequency band.

Example 13 includes the antenna assembly of Example 12, wherein the loading structure includes a conductive strip is oriented perpendicular to the axis of the second via.

Example 14 includes the antenna assembly of Example 10, wherein the stub structure is an open stub or a short stub.

Example 15 includes the antenna assembly of Example 10, further comprising an impedance matching network coupled to the feed pad.

Example 16 includes the antenna assembly of Example 10, wherein the feed pad is located in at least one of a top two layers of an integrated circuit package.

Example 17 includes the antenna assembly of Example 10, wherein the antenna assembly is in an interposer coupled to an integrated circuit package to enable wireless communication for an integrated circuit in the integrated circuit package.

Example 18 includes the antenna assembly of Example 10, wherein the antenna assembly is coupled to an integrated circuit die for wireless communication, wherein the antenna assembly and the integrated circuit die are included in a same integrated circuit package.

Example 19 includes a system comprising: a first integrated circuit package that includes a first integrated circuit; and a second integrated circuit package that includes a second integrated circuit to establish a wireless link with the first integrated circuit via an antenna assembly. The antenna assembly includes: a feed pad; a first via capacitively coupled to the feed pad and conductively coupled to a ground potential; and a second via capacitively coupled to the feed pad.

Example 20 includes the system of Example 19, wherein the second via is conductively coupled to a stub structure.

Example 21 includes the system of Example 19, wherein the antenna assembly further comprises a loading structure capacitively coupled to the feed pad to provide loading or reconfigurability of an operating frequency band.

Example 22 includes the system of Example 21, wherein the loading structure includes conductive strip oriented orthogonally to an axis of the second via.

Example 23 includes the system of Example 19, wherein the antenna assembly further comprises an impedance matching network coupled between the feed pad and the second integrated circuit.

Example 24 includes the system of Example 19, wherein the feed pad is located in at least one of a top two layers of the second integrated circuit package.

Example 25 includes the system of Example 19, wherein the first and second integrated circuit packages are mounted on a same circuit board or on different circuit boards.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. An integrated circuit package comprising:

an integrated circuit; and an antenna coupled to the integrated circuit to enable a wireless communication links in a package-to-package or board-to-board environment, wherein the antenna comprises:

a feed pad on a first layer of the integrated circuit package;

a first via capacitively coupled to the feed pad at a top end of the first via; and a second via capacitively coupled to the feed pad at a top end of the second via, wherein the first via and second via extend through the first layer to a second layer of the integrated circuit package.

2. The integrated circuit package of claim 1, wherein the feed pad is located in at least one of a top two layers of the integrated circuit package.

3. The integrated circuit package of claim 1, wherein the antenna further includes a loading structure capacitively coupled to the feed pad to provide loading or reconfigurability.

4. The integrated circuit package of claim 1, wherein the antenna further includes a stub structures conductively coupled to a bottom end of the second via.

5. The integrated circuit package of claim 4, wherein the stub structure is an open stub.

6. The integrated circuit package of claim 4, wherein a bottom end of the first via is conductively coupled to a ground potential.

7. The integrated circuit package of claim 1, wherein the antenna further includes an impedance matching network coupled between the feed pad and the integrated circuit.

8. The integrated circuit package of claim 7, wherein the impedance matching network includes a balanced-to-unbalanced impedance transformer.

9. The integrated circuit package of claim 1, wherein the feed pad and the first and second vias are located at an edge of the integrated circuit package.

10. An antenna assembly comprising:

a feed pad on a first layer of an integrated circuit package;

a first via capacitively coupled to the feed pad and conductively coupled to a ground potential; and a second via capacitively coupled to the feed pad and conductively coupled to a stub structure, wherein the first via and second via extend through the first layer to a second layer of the integrated circuit package.

11. The antenna assembly of claim 10, further comprising wherein the stub structure extends in a direction that is orthogonal to an axis of the second via.

12. The antenna assembly of claim 11, further comprising a loading structure capacitively coupled to the feed pad to provide at least one of resistive loading, capacitive loading, inductive loading, or reconfigurability of an operating frequency band.

13. The antenna assembly of claim 12, wherein the loading structure includes a conductive strip oriented perpendicular to the axis of the second via.

14. The antenna assembly of claim 10, wherein the stub structure is an open stub or a short stub.

15. The antenna assembly of claim 10, further comprising an impedance matching network coupled to the feed pad.

16. The antenna assembly of claim 10, wherein the feed pad is located in at least one of a top two layers of an integrated circuit package.

17. The antenna assembly of claim 10, wherein the antenna assembly is in an interposer coupled to an integrated circuit package to enable wireless communication for an integrated circuit in the integrated circuit package.

18. The antenna assembly of claim 10, wherein the antenna assembly is coupled to an integrated circuit die for wireless communication, wherein the antenna assembly and the integrated circuit die are included in a same integrated circuit package.

19. A system comprising:

a first integrated circuit package that includes a first integrated circuit; and a second integrated circuit package that includes a second integrated circuit to establish a wireless link with the first integrated circuit via an antenna assembly, wherein the antenna assembly includes:

a feed pad on a first layer of an integrated circuit package;

a first via capacitively coupled to the feed pad and conductively coupled to a ground potential; and a second via capacitively coupled to the feed pad, wherein the first via and second via extend through the first layer to a second layer of the integrated circuit package.

20. The system of claim 19, wherein the second via is conductively coupled to a stub structure.

21. The system of claim 19, wherein the antenna assembly further comprises a loading structure capacitively coupled to the feed pad to provide loading or reconfigurability of an operating frequency band.

22. The system of claim 21, wherein the loading structure includes conductive strip oriented orthogonally to an axis of the second via.

23. The system of claim 19, wherein the antenna assembly further comprises an impedance matching network coupled between the feed pad and the second integrated circuit.

24. The system of claim 19, wherein the feed pad is located in at least one of a top two layers of the second integrated circuit package.

25. The system of claim 19, wherein the first and second integrated circuit packages are mounted on a same circuit board or on different circuit boards.

* * * * *